United States Patent [19]
Keck

[11] Patent Number: 5,939,723
[45] Date of Patent: Aug. 17, 1999

[54] RADIATION COUNTER AND METHOD FOR MEASURING THE LEVEL OF RADIATION IN MUSCLE TISSUE

[76] Inventor: Max L. Keck, P.O. Box 873, Okmulgee, Okla. 74447

[21] Appl. No.: 08/883,184

[22] Filed: Jun. 26, 1997

[51] Int. Cl.[6] .................................................. G01T 1/167
[52] U.S. Cl. ...................................... 250/363.01; 250/366
[58] Field of Search .............................. 250/363.01, 366, 250/393

[56] References Cited

U.S. PATENT DOCUMENTS

| | | |
|---|---|---|
| D. 275,083 | 8/1984 | Pollard . |
| 3,376,417 | 4/1968 | Keck et al. . |
| 3,732,422 | 5/1973 | Brunson et al. . |
| 3,767,915 | 10/1973 | Battist . |
| 3,777,142 | 12/1973 | Grenier et al. . |
| 3,835,325 | 9/1974 | Fishman . |
| 3,898,463 | 8/1975 | Noakes . |
| 4,095,107 | 6/1978 | Genna et al. . |
| 4,352,019 | 9/1982 | Pollard . |
| 4,437,013 | 3/1984 | Hondorp . |
| 4,492,869 | 1/1985 | Suzuki et al. . |
| 4,590,377 | 5/1986 | Lukens . |
| 4,638,166 | 1/1987 | Baudro . |
| 4,642,463 | 2/1987 | Thoms . |
| 4,675,523 | 6/1987 | Garlick . |
| 4,760,260 | 7/1988 | Walsh et al. . |
| 4,914,306 | 4/1990 | Dufrane et al. . |
| 5,012,114 | 4/1991 | Sisson, Jr. . |
| 5,034,610 | 7/1991 | Spacher et al. . |
| 5,416,330 | 5/1995 | Abul-Faraj et al. . |
| 5,524,041 | 6/1996 | Grenier . |
| 5,531,228 | 7/1996 | Doerfel ................................... 600/431 |
| 5,613,493 | 3/1997 | Schafer . |
| 5,616,925 | 4/1997 | Rhiger et al. . |

OTHER PUBLICATIONS

Derek H. Pringle and Roamn Kulwich, "K[40] Gammas Give Estimate of Lean Meat Content," *Nucleonics*, pp. 74–78, Feb. 1961.

*Primary Examiner*—Constantine Hannaher
*Attorney, Agent, or Firm*—McKinney & Stringer, P.C.

[57] ABSTRACT

A radiation counter and method for measuring lean muscle mass. The invention is small, lightweight, economical and easily transportable because it eliminates the use of large, heavy room-sized and source-size shielding to block ambient radiation. The radiation counter is particularly suited for measuring gamma radiation from K[40] out-of-doors since the primary outdoor sources of K[40] are animals and the ground. The radiation counter comprises a frame for supporting a radioactive source and a radiation detection unit ("RDU"). The RDU comprises a scintillation detector and a lead shield partially enclosing the scintillation detector. An aperture is formed in the top side of the shielding to expose a portion of the scintillation detector and thus permit the detection of radiation in the desired energy level. The radiation counter is positioned with respect to the source so as to block the penetration of background radiation and eliminate the use of a large, heavy shield. The radiation counter may be used directly on the ground or mounted on another device, such as a trough or trailer. Growth tendencies, hereditary characteristics, lean ratios of animals and carcasses may be assessed using the radiation counter.

89 Claims, 12 Drawing Sheets

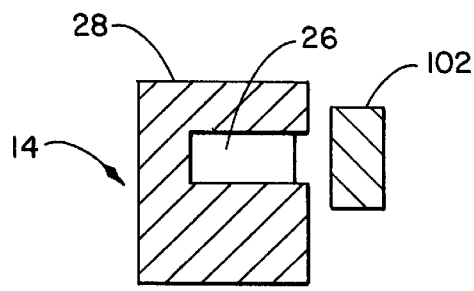
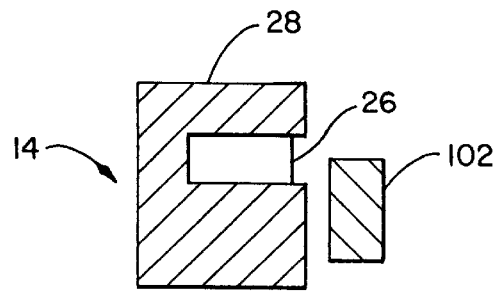
FIG. 9A  FIG. 9B
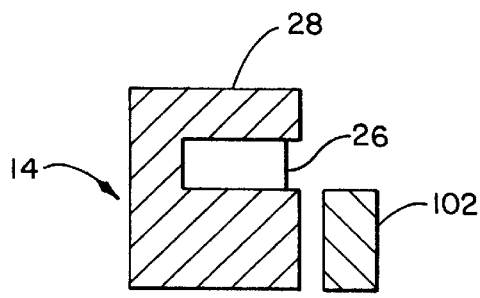
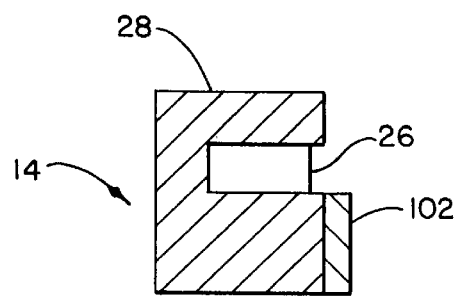
FIG. 9C  FIG. 9D

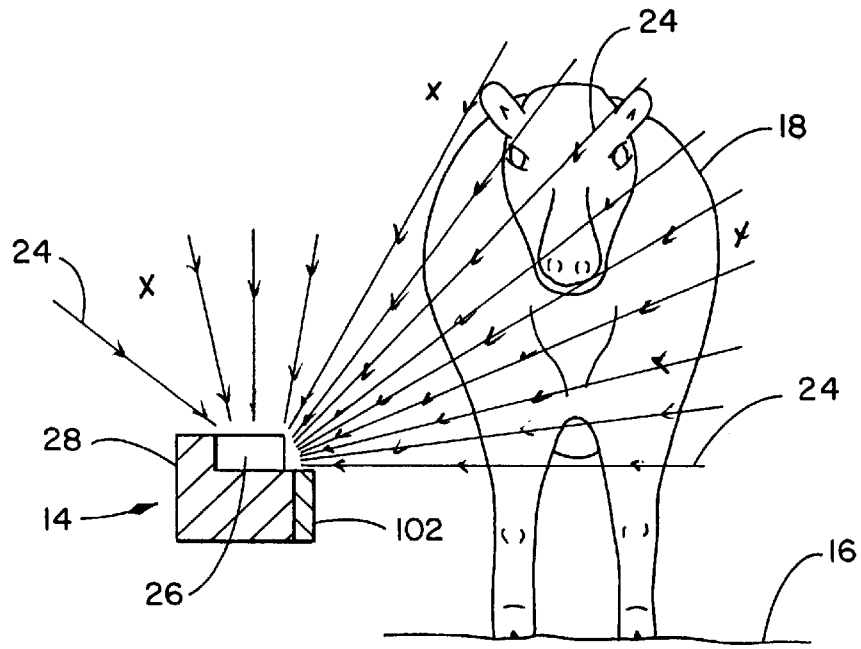
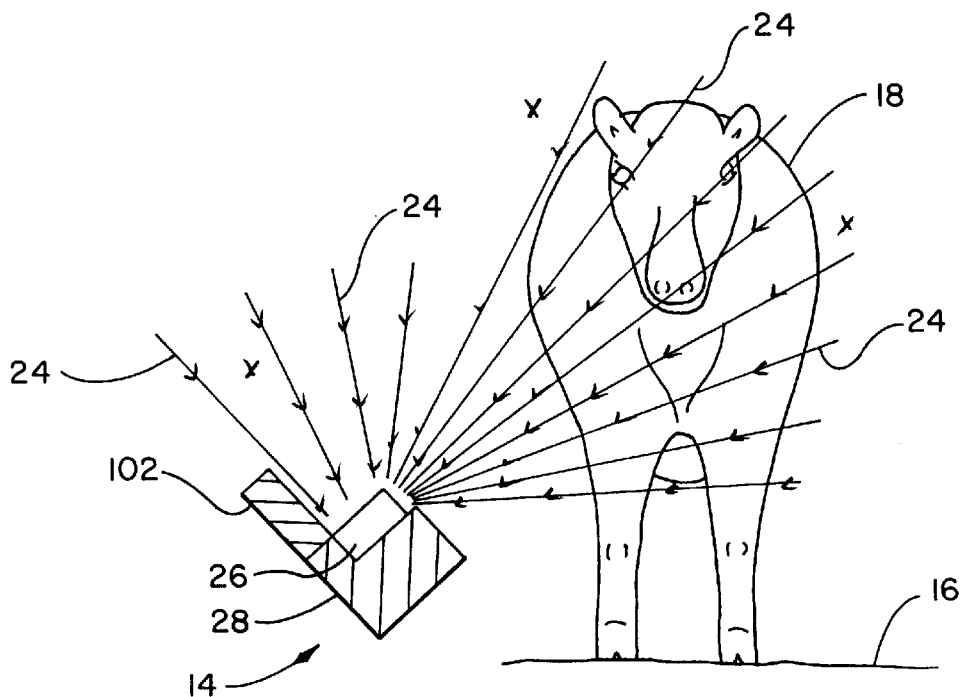
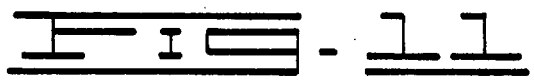

RADIATION COUNTER AND METHOD FOR MEASURING THE LEVEL OF RADIATION IN MUSCLE TISSUE

FIELD OF THE INVENTION

This invention relates generally to radiation detection units and, in particular, radiation detection units for use out-of-doors to measure the lean muscle mass of animals. The invention further relates to methods of measuring the lean muscle mass of animals.

SUMMARY OF THE INVENTION

The present invention is directed to a radiation counter for measuring the level of radiation from a radioactive source. The radiation counter is intended for use in an out-of-doors environment and comprises a frame adapted to support the source and a radiation detection unit positionable near the source so as to minimize detection of terrestrail radiation. The radiation detection unit defines a detection surface and is capable of detecting radiation from the source positioned anywhere within an upper $2\pi$ solid angle relative to the detection surface of the radiation detection unit. The radiation detection unit is adapted to be positioned with respect to the source so as to minimize detection of ambient radiation.

The present invention is further directed to A lean muscle measurement device for determining lean body mass by measuring the amount of $K^{40}$ present in the source. The lean muscle measurement device is intended for use in an out-of-doors environment and comprises a frame adapted to support the animal and a radiation detection unit positionable near the animal so as to minimize detection of terrestrail radiation. The radiation detection unit defines a detection surface and is capable of detecting radiation from the animal positioned anywhere within an upper $2\pi$ solid angle relative to the detection surface of the radiation detection unit. The radiation detection unit is adapted to be positioned with respect to the animal so as to minimize detection of ambient radiation.

Finally, the present invention is directed to a method of detecting radiation from a source in an out-of-doors environment and using a radiation counter. The radiation counter defines a detection surface and is characterized by the ability to detect radiation from the source positioned anywhere within an upper $2\pi$ solid angle relative to the detection surface of the radiation counter. The method comprises the steps of positioning the radiation counter with respect to the source so that the source is positioned within an upper $2\pi$ solid relative to the detection surface of the radiation counter and so that detection of ambient radiation is minimized.

BRIEF DESCRIPTION OF THE DRAWINGS

Reference is now made to the following detailed description of the preferred embodiments taken in conjunction with the accompanying drawings.

FIGS. 9A through 9D are perspective views illustrating various placements of the extension of the shield of the radiation detection unit of the present invention.

FIG. 10 is a perspective view showing a portion of the shield of FIG. 7 removed to expose a greater surface area of the detector.

FIG. 11 is a perspective view showing a portion of the shield of FIG. 8 removed to expose a greater surface of the detector.

DETAILED DESCRIPTION OF THE PREFERRED EMBODIMENTS

Figure 1:
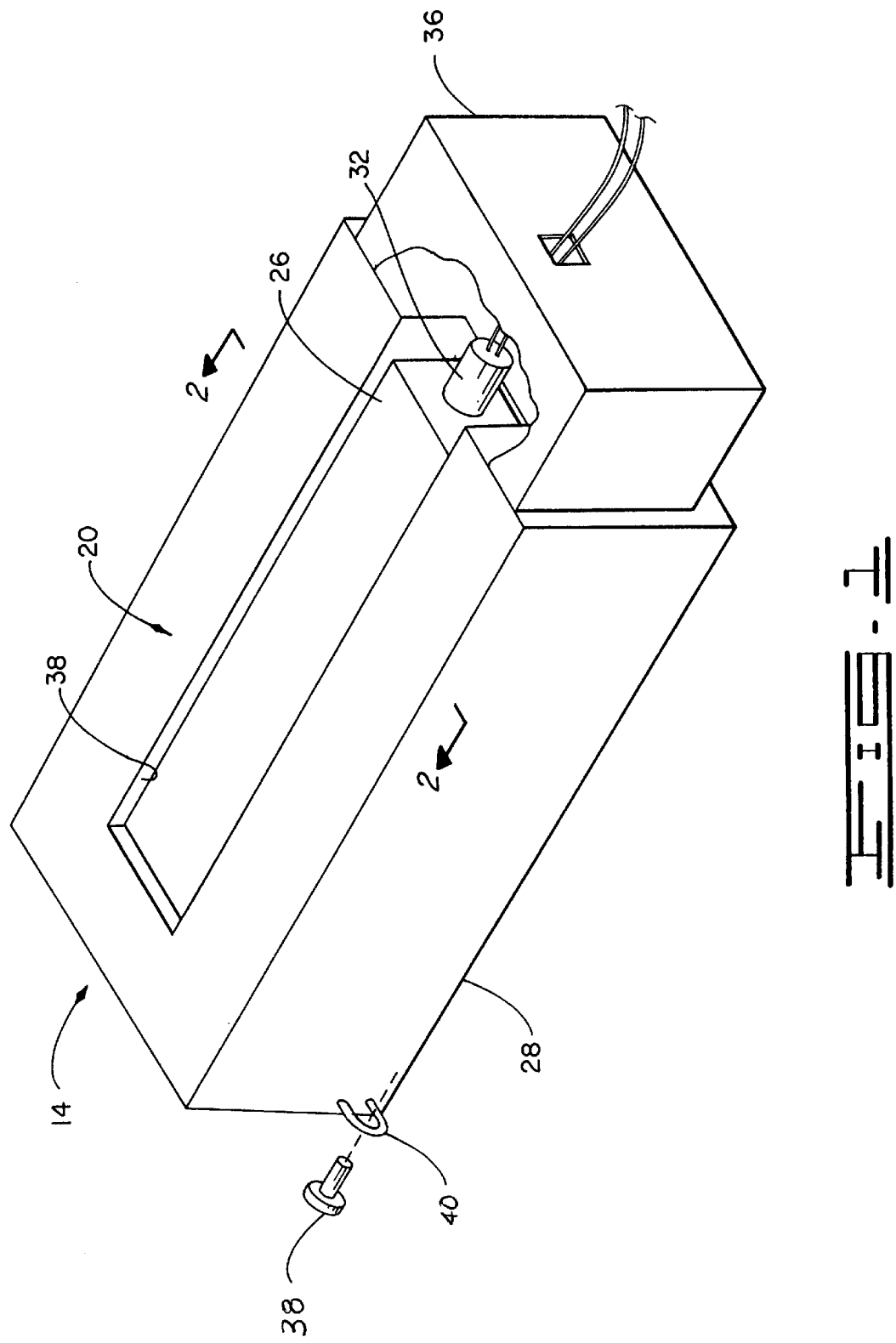
FIG. 1 is a perspective, partially cut away view of the radiation detection unit of the radiation counter constructed in accordance with the present invention.

The decomposition of unstable nuclei is called radiation. An unstable nuclei decomposes producing a stable atom and a radioactive particle, such as a neutron or an alpha, beta or gamma ray.

Radioactive decay may be induced through artificial means. The processes of fission, fusion or bombardment of nuclei with other nuclei or particles are well-known means by which nuclei are caused to artificially decompose. Detonation of a hydrogen bomb is an example by which radiation is artificially produced by the fission of a Uranium atom.

Radioactive decay also takes place in nature. Certain naturally occurring elements form isotopes which have identical chemical properties but which have a higher atomic mass due to the presence of extra neutrons in the nucleus. Theses isotopes are unstable and naturally decompose into stable nuclei and radiation particles. This process is called radioactive decay. Several elements existing in nature form radioactive isotopes, including Potassium, Carbon, Cobalt, Sodium, and Cesium.

Measurement of the radioactive particles emitted from a source is indicative of certain properties of the source. For example, Strontium and Rubidium both form isotopes which are present in rocks. The presence of these elements in ancient rocks has been measured and their half-lives used to calculate the age of the Earth.

Similarly, by measuring the radioactive Potassium ($K^{40}$) present in an animal, the lean percentage of the animal may be calculated. It is known that $K^{40}$ is present in the muscle but only minimally present, if at all, in the fat tissue or bones of animals. The $K^{40}$ atoms in the muscle tissue spontaneously decompose and emit gamma rays. The gamma rays emitted from a radioactive source may be counted and the resulting count used to calculate the lean muscle mass of the animal.

Many conventional radiation counters require large rooms to house the counter and the source and to shield the counter from background radiation. In other conventional radiation counters, although room-sized shields are not used, large walls are erected near the source to block penetration of radiation particles. These machines, while effective, are heavy, unwieldy and require large equipment and crews for transportation and installation. The time required for installation can take up to a week and requires considerable expense and manpower.

Once a conventional radiation counter is installed, the radioactive source is required to enter the room or the machine, be fitted with various harnesses and other restraining devices and stand still while radiation particles are counted. This proves particularly difficult with animals, like cattle, which must be herded and guided into the harnessing device.

Due to their gross weight and size, conventional radiation counters are also difficult to transport and costly to manufacture. Cranes and specially designed trailers are required to lift and move the massive machines. Often, the cost of such machines is prohibitive to individuals and small businesses which could benefit from the technology.

Although $K^{40}$ is present in the ground, as well as in the muscle mass of animals, it typically is present only minimally in air or species of the plant kingdom. Thus, in an outdoor environment, the sources of $K^{40}$ are animals and the ground. In accordance with this principle, the radiation counter of the present invention eliminates the use of large room-sized and source-sized shields to block detection of ambient radiation.

The present invention provides a radiation counter and an economically feasible method for measuring the lean muscle mass in animals. The present invention, in comparison to conventional radiation counters, is small, economical, lightweight, and easily installed and transported. The radiation counter of the present invention comprises a frame adapted to hold the source and a radiation detection unit positionable near the source. The radiation detection unit is positionable near the source in a manner which eliminates the need for a shield surrounding the source to shield background radiation from detection. A small shield surrounds the detection device, and the unit is uniquely positioned with respect to the source so that $K^{40}$ originating from the ground, or terrestrial radiation is not detected. As used herein, "terrestrial radiation" means radiation emanating from the ground including earth, rocks, plants and other sources resting on the ground.

The radiation counter of the present invention particularly is adapted for use in the animal husbandry industry. The radiation counter works well out-of-doors in a field or corral where hoof stock are feeding. The radiation counter may be used to chart the growth of lean muscle mass of an animal, thus indicating when to breed, sell or slaughter the animal. The radiation counter may be attached to or set up near a trough where animals feed and may be adapted to be activated automatically when an animal activates a photoelectric sensor, thus permitting passive monitoring of herds. Each animal may be automatically identified, weighed and analyzed while feeding. Thus, there is no need to herd the animals into a room, chute or pen prior to analysis. Finally, the radiation counter of the present invention may be used to grade carcasses. These and other advantages of the invention will be apparent from the following detailed description of the preferred embodiments.

The Embodiment of FIGS. 1 Through 5

Figure 2:
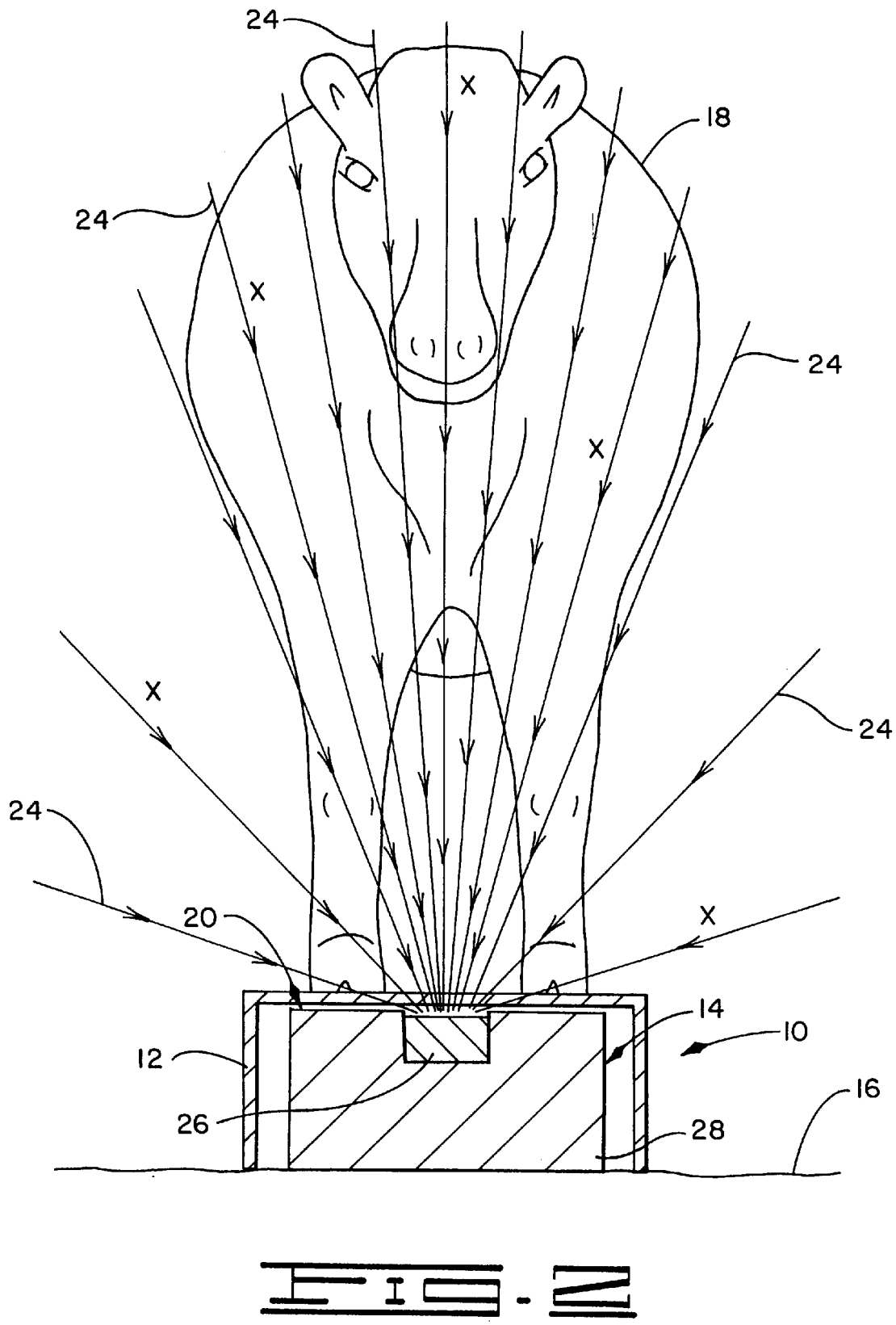
FIG. 2 is cross-sectional view taken along line 2—2 of FIG. 1 showing the radiation detection unit assembled with the frame of a preferred embodiment of the radiation counter of the present invention.

Turning now to the drawings in general and to FIGS. 1 and 2 in particular, there is shown therein a radiation counter constructed in accordance with the present invention and designated generally by the reference numeral 10. The radiation counter 10, which is suited particularly for use in an out-of-doors environment, comprises a frame 12 adapted to support a source of radiation and a radiation detection unit 14 ("RDU") positionable near the source so as to minimize detection of ambient radiation. The RDU 14 is constructed and positioned with respect to the source in a manner yet to be described which eliminates the use of large room-sized and source-sized shields to block ambient radiation.

The radiation counter 10 may be used directly on the ground 16 or mounted to any number of other devices, structures or surfaces. For instance, the radiation counter 10 may be mounted near or on a trough where the animal is analyzed while feeding. Additionally, the radiation counter 10 may be mounted in a livestock trailer for hauling animals so that the animal is analyzed as it enters and exits the stock trailer or as it stands in a stall in the trailer.

The RDU 10 is positionable near a radioactive source 18 supported on the frame 12 and defines a detection surface 20 adapted to detect radiation in a manner yet to be described. In the preferred embodiment, the RDU 14 is capable of detecting gamma rays emanating from the source 18 positioned within an upper $2\pi$ solid angle relative to the detection surface 20 of the RDU 14. As used herein, "upper $2\pi$ solid angle" means the hemispherical space above the detection surface 20 of the RDU 10 and having a bottom plane horizontal with the ground.

In one preferred embodiment, shown in FIG. 2, the source 18, here a cow, is positioned on the frame 12 directly above the RDU 14. Gamma rays 24, indicated by arrows pointing in direction X and located within the 180° angle of detection, are detected at the detection surface 20 of the RDU 14. Positioned thus, the source 18 serves as the primary origin of gamma radiation detected by the RDU 14. A minimal amount of background radiation emanates from the environment and is subtracted when calculating the muscle mass of the source 18.

With continuing reference to FIG. 2, the RDU 14 preferably comprises a detector 26 and a shield 28. The RDU 14 preferably is elongate for a purpose yet to be described. Although shown to be rectangular in cross-section, the RDU 14 may be any shape which permits the RDU 14 to be positioned with respect to the source in a manner which eliminates the need to use large shields to block ambient radiation. For example, the RDU 14 may be generally circular and mounted on a supporting structure.

The frame 12 preferably is constructed to permit the source 18 to stand above the detection surface 20 of the RDU 14 or to the side of the source in a manner which is yet to be described. This configuration permits the RDU 14 to be positioned with respect to the source 18 such that the need for a shield partially or wholly surrounding the source is eliminated. In this configuration, ambient radiation from the ground 16 is blocked in a manner yet to be described and the primary source of radiation is the source 18 positioned above the detection surface 20 of the RDU 14.

The frame 12 may be constructed as a ramp and platform assembly to enable livestock to easily enter and exit the radiation counter 10. In those applications where herds or large numbers of livestock are analyzed, for instance at feedlots and stockyards, the ramp and platform construction allows movement of the herd over the radiation counter 10 in an assembly line fashion. Analysis of the herd is performed more efficiently.

The frame 12 should be sturdy and durable yet thin enough to permit penetration of gamma rays. Gamma rays are capable of penetrating most substances, depending upon the thickness; thus, any material which is sufficient to support the weight of the source 18 yet allow the gamma rays to penetrate the frame 12 for detection by the RDU 14 will serve as a suitable frame material. Steel approximately one-half inch thick is one preferred frame 12 material.

Figures 3, 4:
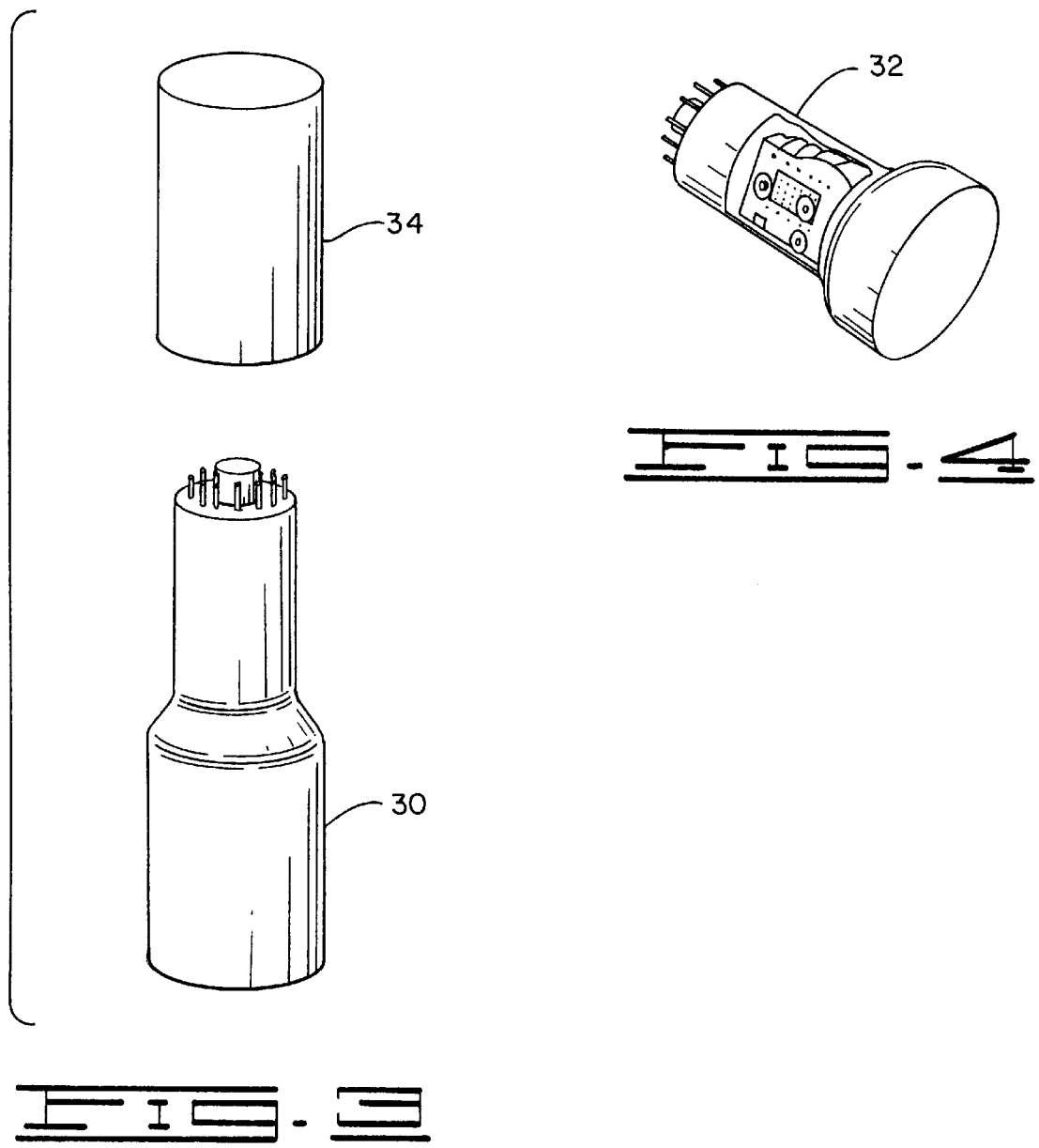
FIG. 3 is a perspective view of a scintillation detector utilized in the radiation counter of the present invention.
FIG. 4 is a perspective view of a photomultiplier tube utilized in the radiation counter of the present invention.

In the preferred embodiment, the detector 26 comprises a scintillation detector. As shown in FIGS. 3 and 4, the detector 26 comprises a housing 30, a sodium iodide crystal (not shown) hermetically sealed in the housing, a photomultiplier tube 32 optically coupled to the sodium iodide crystal and a light shield 34 covering the photomultiplier tube. Such detectors are known in the art and may be purchased from a suitable manufacturer. One such scintillation detector 26 satisfactory for this purpose is manufactured by Bicron® of Newbury, Ohio. The geometrical configuration typically is not a limiting factor in radiation detection, and the scintillator may be cylindrical, as shown in FIG. 3, rectangular as shown in FIGS. 1 and 2, or any other geometry permitting detection of radiation in the desired energy range.

The selection of a suitable detector 26 depends upon the type of radiation being measured and the incident energy levels of the subject radiation. In the preferred embodiment, the detector 26 is adapted to detect gamma radiation; thus, a scintillator is preferred due to its responsiveness to photons with incident energy levels ranging between 15 keV to 3 MeV, the energy level of most gamma rays. A detector 26 operating in a different energy range may be used to detect the presence of other radioactive particles having different energies. Gas filled scintillators detect the presence of x-rays and low energy gamma rays and also would be suitable when counting alpha or beta radiation. A semiconductor detector is an acceptable but costly substitute for a scintillation detector. The radiation counter 10 may be adapted to count alpha, beta or other charged particles for which a silicon charged particle detector, electron multipliers or liquid scintillators may be substituted for the detector 26. It will be appreciated that, for gamma radiation, any detector 26 producing an electrical pulse upon detection of radiation in the desired energy range will be an acceptable substitute.

The detector 26 sees gamma rays emanating from the source 18 and produces flashes of light, or light pulses, corresponding in magnitude to the energy level of the incident gamma rays. The photomultiplier tube 32, which is optically coupled to the detector 26, converts the light pulses into electronic pulses corresponding to the magnitude of the incident light pulses. The electronic pulses are amplified and transmitted by system electronics 44 in a manner yet to be described to a computer where the data is analyzed. The end of the photomultiplier tube 32 leading to the system electronics 44 is protected by cover 36.

It now will be appreciated that the detector 26, and thus the RDU 14, preferably are elongate and approximate the length of the source 18 to enhance the accuracy of the radiation counter 10. In the preferred embodiment, the detector 26 is approximately 48 inches (122 centimeters) long, consistent with the length of the average cow. A shorter or longer detector 26, or RDU 14, may be used as needed or several RDU's may be connected in sequence to achieve the optimum length for the desired application. The accuracy of nuclear counting depends upon the accuracy of the spectral data. A longer detector 26 is able to gather more data than a shorter one in the same amount of time. Therefore, as the amount of spectral data gathered per unit time increases, the conclusions drawn from the data will be more accurate because the data constitutes a more representative sampling of the gamma particles radiated by the source 18. Connecting additional RDU's 14 with adapters, shown in FIG. 1 as a pin 38 receivable in eye hook 40, or increasing the length of the detector 26 increases the speed of the counting process without sacrificing accuracy. Nevertheless, it is important to properly size the detector 26 for the application and the source 18 to prevent unduly high background readings.

With continuing reference to FIGS. 1 and 2, the shield 28 houses the detector 26 and serves as an impenetrable barrier to minimize detection of gamma radiation originating from the ground 16. The shield 28 is sized and constructed to reduce the environmental background to a level that is lower than the gamma radiation activity level of the source 18.

In one preferred embodiment, the shield 28 is positionable near the detector 26 and surrounds the detector on all sides thereof except the detection surface 20 as shown in FIGS. 1 and 2, thus forming an aperture 38 in the shield 28 and exposing at least a portion of the detector 26. The aperture 38 is sized to enable the detector 26 to detect gamma rays, preferably along the full length of the detector 26. It will be appreciated that the size of the aperture 38 and the configuration of the shield 28 may be modified as desired to expose a greater or lesser surface area of detector 26.

The shield 28 may be comprised of any material creating an impenetrable barrier to the type of radiation being counted. A material pure in elemental composition is preferred to prevent detection of impurities present in the shield 28. Moreover, the shield 28 preferably is comprised of a material having a radioactivity count in an energy level dissimilar to that of $K^{40}$. For those applications where gamma rays are counted, some suitable shield 28 materials include high purity lead, steel and water.

The required thickness of the shield 28 depends upon the composition of the shield material. For gamma spectroscopy applications, a shield 28 comprised of water must be at least 2 feet (61 centimeters) thick. Alternatively, a six inch (15.24 centimeters) lead shield has proven effective in creating a barrier impenetrable by gamma radiation. It will be appreciated that the thickness of the shield will vary with the composition of the shield, the application for which the counter 10 is used and other factors.

The shield 28 may be integrally formed or comprised of a plurality of modular elements, such as lead bricks, assembled to house the detector 26. The shield 28 generally conforms to the shape of the detector 26 to house the detector and thereby block the detection of gamma radiation originating from the ground 16.

It will now be appreciated that the shield 28 surrounds the detector 26 in a manner which reduces the environmental background to a level that is lower than the gamma radiation activity level of the source 18 and enables the detection of gamma radiation from the source 18. Further, it now will be appreciated that the RDU 14 is constructed and positioned with respect to the source in manner which eliminates the use of large room-sized and source-sized shields to block ambient radiation.

Figure 5:
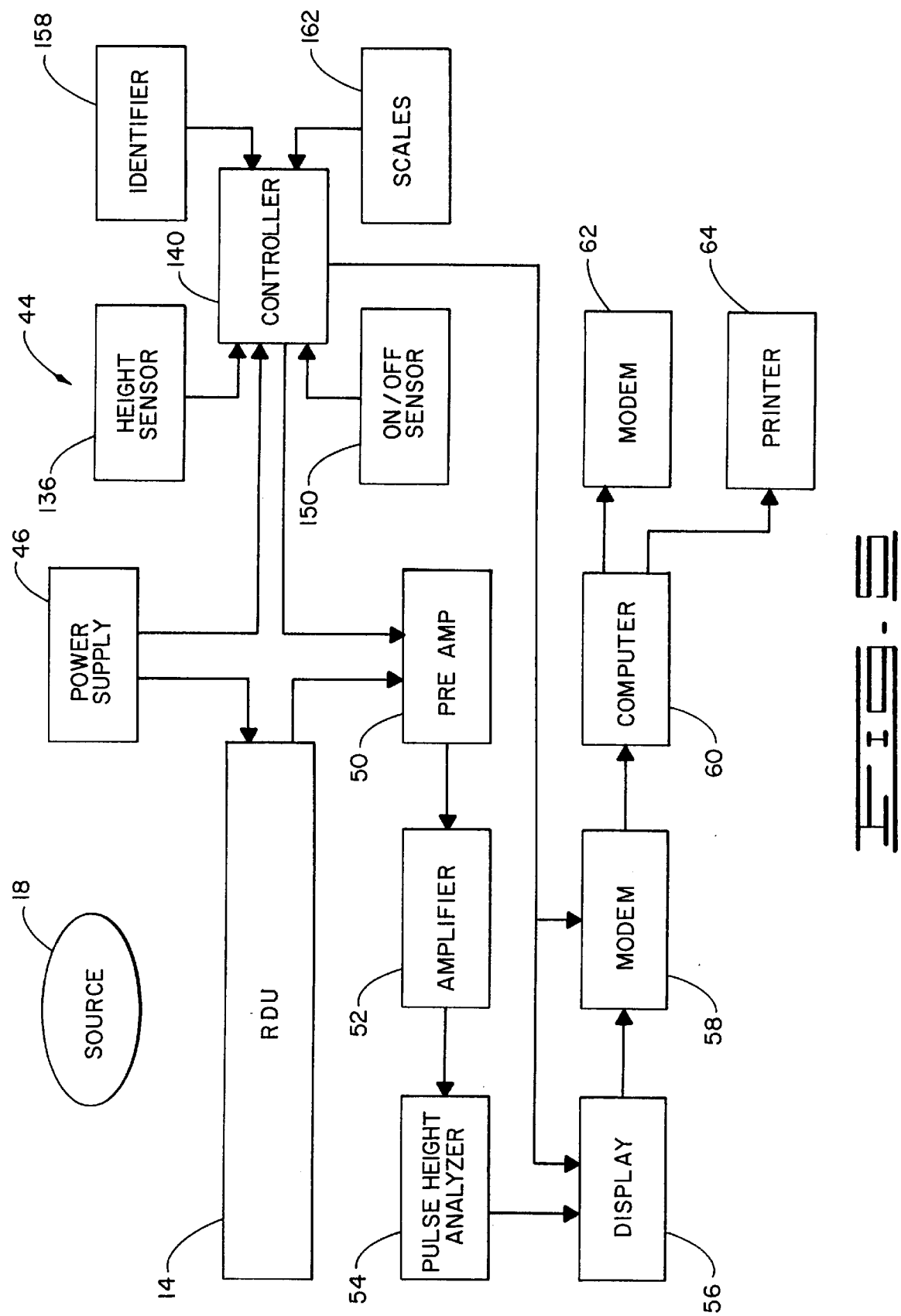
FIG. 5 is a block diagram of the electrical circuitry of the radiation counter of the present invention.

Turning now to FIG. 5, the radiation counter 10 preferably further comprises a data processing system 44 powered by a standard power supply 46 and adapted to analyze the signals originating from the RDU 14. A gamma ray contacting the detector 26 produces a light pulse which the photomultiplier 32 converts to an electrical signal as hereinabove described. A conventional gamma spectroscopy system is employed to preamplify and amplify the electrical signal originating from the photomultiplier 32. The gamma spectroscopy system comprises a preamplifier 50, which amplifies the electronic pulse from the photomultiplier, an amplifier 52 which again amplifies the pulse to produce an electronic signal corresponding in energy to the magnitude of the original light pulse, and a pulse height analyzer 54 which converts the electronic signal into a digital signal. The resulting data may be displayed on site at display 56 or transmitted via modem 58 to a computer 60 using standard communication protocols with either an RS-232 serial cable or modem 62 where the data is stored or analyzed.

In the preferred embodiment, conventional gamma spectroscopy software technology is employed. Once the data is transferred to the computer, spectral information will be analyzed using commercially available gamma spectroscopy software. This software will support multiple detectors and employ standard gamma spectroscopy utilities, which include, without limitation, an amplifier, high voltage control detector energy, resolution and efficiency calibrations, peak search and identification capabilities and qualitative analysis features including background subtraction, multiple photopeak deconvolution and spectral data reports.

The data processing system 44 preferably includes means to time the duration of the analysis, so that the number of pulses per unit of time may be determined. The more concentrated the pulses per unit of time, the leaner the animal is.

The Embodiment of FIGS. 6 Through 9

With reference now to FIGS. 6 through 9, a radiation counter 100 forming a second embodiment of the present invention is illustrated. A number of the elements of radiation counter 10 are identical in appearance and function to those of radiation counter 100 and are identified by the same reference numerals.

Figure 6:
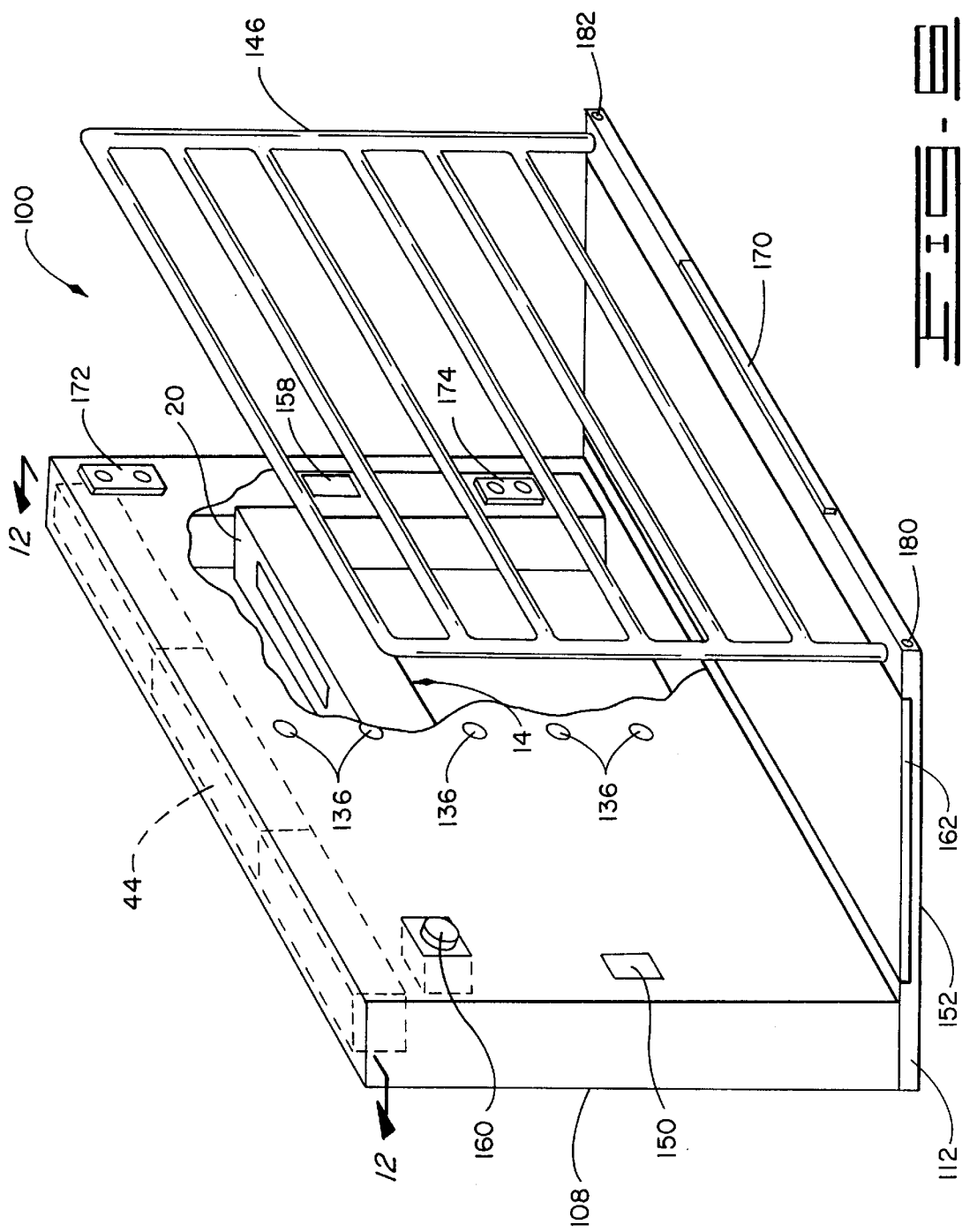
FIG. 6 is a perspective, partially cut away view of the second embodiment of the radiation counter of the present invention.
Figure 7:
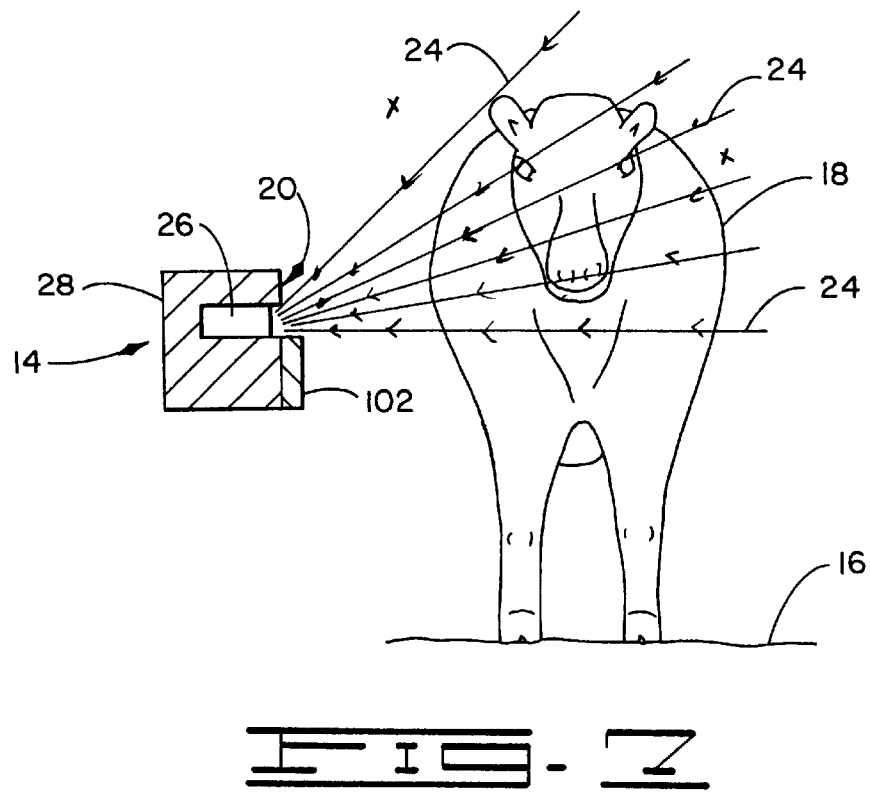
FIG. 7 is a perspective view showing an alternative preferred positioning of the radiation detection unit with respect to a source of radiation.
Figure 8:
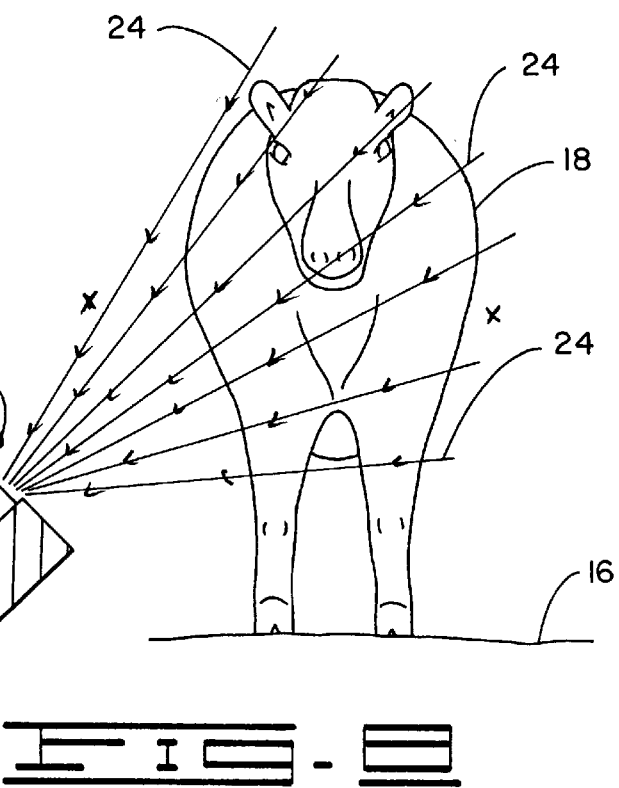
FIG. 8 is a perspective view showing an alternative preferred positioning of the radiation detection unit with respect to a source of radiation.

Radiation counter 100 comprises a frame 112 and RDU 14 as hereinabove described. Turning now to FIGS. 6, 7 and 8, the frame 112 of radiation counter 100 is adapted to support the RDU 14 to the side of the source 18 in a manner yet to be described. When positioned to the side, the body of the source 18 serves as a shield blocking detection of gamma radiation originating from the ground 16.

It will be appreciated that the bulk of an animal's muscle mass typically is found in the abdomen of the animal, which as used herein refers to the body of the animal excluding the neck and the head. The ideal side location for the RDU 14 depends at least in part upon the configuration of the shield 28 and the particular source 18. Typically, though not always, the shield 28 should be centrally positioned with respect to the abdomen of the source or slightly below and to the side of the abdomen of the source. This positioning gives a more representative sampling of the gamma radiation present in and on the source.

To achieve that end, the RDU 14 may be positioned with the detection surface 20 facing the source 18 as shown in FIGS. 7 and 8. FIG. 7 illustrates the use of the radiation counter 100 where the detection surface 20 of the RDU 14 is centered generally perpendicularly to the source and faces the abdomen of the source. In FIG. 8, the detection surface 20 of the RDU 14 faces the source 18 and is level with the underside of the abdomen of the source, but is positioned at an angle with respect thereto. Alternatively, the RDU 14 may be positioned with the detection surface 20 facing upward and the source positioned to the side of the RDU, as illustrated in FIG. 6. It will be appreciated that radiation counters 10 and 100 may be constructed to position the RDU 14 with respect to the source in a number of ways, only a few of which have been illustrated and described herein, and each of which is effective in counting gamma radiation from the source 18 and blocking the detection of ambient radiation.

With reference now to FIGS. 7 and 9A through 9D, the shield 28 of the RDU 14 preferably further comprises an extension 102 adapted to further minimize the detection of ambient radiation. The extension 102 of the shield 28 preferably creates a "shelf-like" structure which blocks the path of gamma rays from the ground 16 to the detector 26 and causes the detector to "see" at about a 90° angle. The extension 102 is particularly useful in those embodiments where the RDU 14 is positioned beside the source 18 and some gamma rays originating from the ground bypass the legs of the animal to reach the detector 26. The extension 102 further obstructs the path of ambient radiation in this susceptible area.

Multiple RDU's 14, either with or without a portion of the shield removed, may be stacked on top of each other adjacent the source 18 to achieve a desired height for the source or to increase the speed of the counting process. It is preferable to position the lowest RDU 14 in the stack adjacent the lower abdomen of the source 18.

The extension 102 may be integrally formed with the shield 28 or may be removable from the shield, as would be the case where the shield comprises a plurality of modular elements, such as lead bricks. Moreover, the extension 102 need not be connected to or in physical contact with the shield 28. As illustrated in FIGS. 9A through 9D, the extension 102 may be physically separated from the shield and placed at varying locations and distances from the shield. The effectiveness of the extension 102 depends upon the location of the extension with respect to the shield, and the source 18 and other factors. The location best suited for the testing conditions should be selected. The extension 102 may be comprised of the same material as the shield 28 or of any other substance effective to obstruct the penetration of the subject radiation.

Turning now to FIGS. 10 and 11, portions of the shield 28 may be removed to expose a greater surface area of the detector 26. Since most ambient gamma radiation originates from the ground 16, it is preferable to remove the portion of the shield 28 situated opposite the ground. As shown in FIG. 11, the shield 28 may comprise an extension 104 on the side 106 of the detector 26 opposite the source 18 to block detection of background radiation.

A shield 28 comprised of a plurality of modular elements, such as lead bricks, is particularly amenable to modification. Simply by removing bricks from the appropriate area of the RDU 14 and exposing more surface area of the detector 26, the efficiency of the radiation counter 10 is increased. Likewise, an integrally formed shield 28 may be adapted to permit removal of a portion of the shield to expose a greater surface area of the detector 26.

Figure 12:
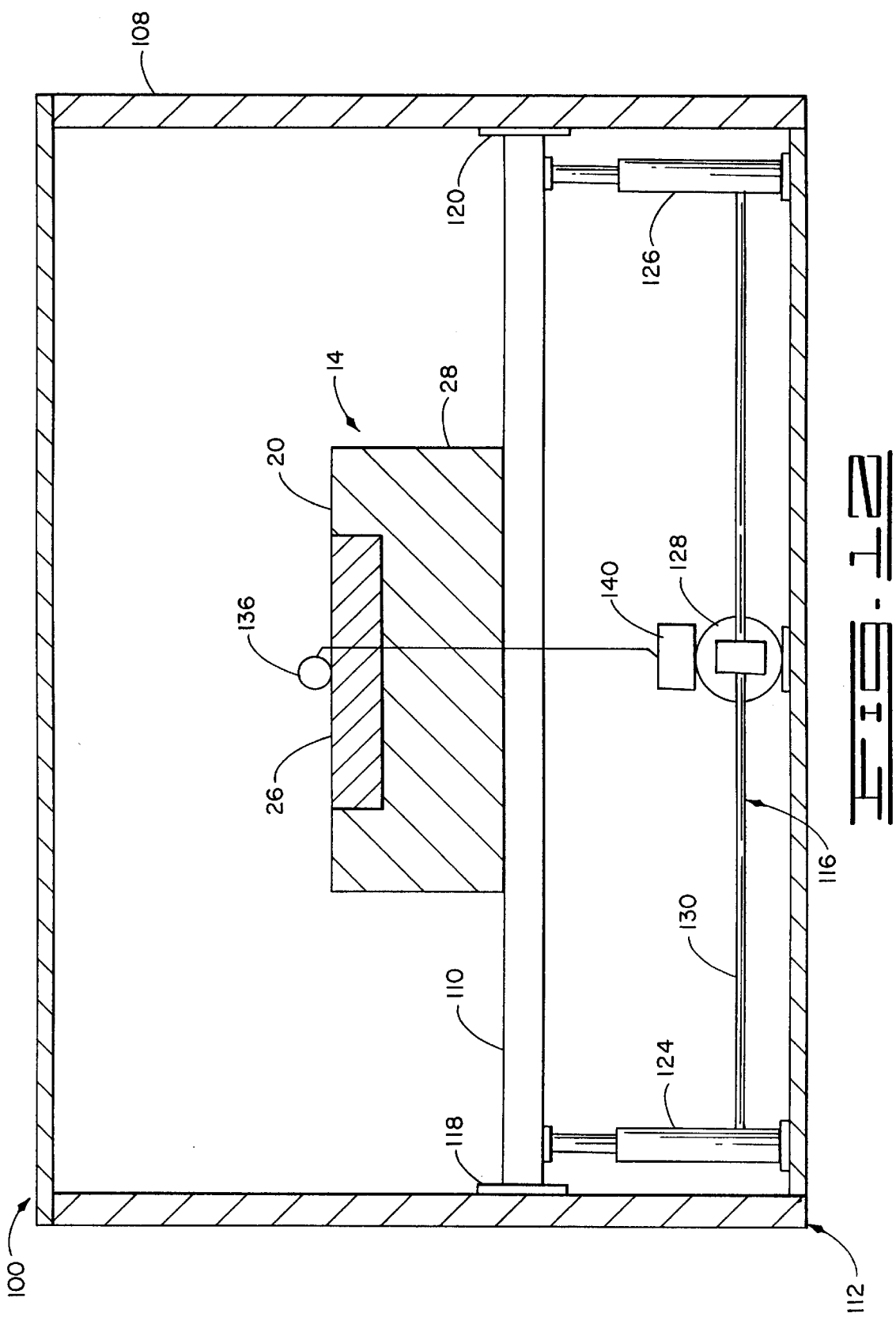
FIG. 12 is a cross sectional view of the RDU adjustment assembly of the radiation counter of the present invention taken along line 12—12 of FIG. 6.

With reference now to FIGS. 6 and 12, the frame 112 preferably further comprises a housing 108 for the RDU 14. The housing 108 partially or fully encloses the RDU 14 and protects the RDU against damage from animals and the elements. The housing 108 comprises an RDU support member 110, shown in cross-section in FIG. 12 and adapted to support the RDU 14 near the abdomen of the source 18. It will now be appreciated that the RDU 14 is supported to the side of the source 18 by support member 110, which in the preferred embodiment comprises a shelf adapted to hold the RDU 14 in a stable position near the abdomen of the source 18.

The position of the RDU 14 is adjustable to obtain the optimal location for the source 18 undergoing analysis. To that end, the radiation counter 100 preferably further comprises an adjustment assembly 116, shown in FIG. 12, adapted to vertically adjust the position of the RDU 14 to the appropriate height for the source 18. The adjustment assembly 116 comprises opposing parallel guide plates 118 and 120, a pair of hydraulic cylinders 124 and 126 operatively connected with the RDU support member 110, a hydraulic pump 128, and a hose 130 operatively connecting the pump and the hydraulic cylinders. In operation, the hydraulic pump 128 pumps fluid under pressure through the hose 130 to the cylinders 124 and 126, which causes the hydraulic cylinders to extend. Extension of the cylinders 124 and 126 raises the RDU support member 110 along the guide plates 118 and 120, thus raising the level of the RDU 14 to the appropriate height for the source 18. The operation is reversed to lower the RDU 14. It will be appreciated that other mechanisms, such as linear actuators, pneumatic cylinders, or a system of jacks and levers, are effective to adjust the position of the RDU 14 and that the preferred adjustment assembly described herein merely comprises one means through which positioning of the RDU may be effectuated.

Radiation counter 100 further may comprise a sensor 136 adapted to determine the height of the source. In the preferred embodiment, the sensor comprises a photoelectric eye which determines the optimum RDU 14 location for the source 18. Height sensor 136 is operated by computerized controller 140, which forms a part of the system electronics 44 as illustrated in FIG. 5.

The frame 112 of the radiation counter 100 preferably further comprises an adjustable side panel 146, shown in FIG. 6, adapted to restrain a source within the confines of the frame 112. The side panel 146 is preferably adjustable to accommodate varying sizes of sources.

It will be appreciated that the radiation counter 100 may be manually operated or may be adapted to permit passive monitoring when an operator is not present. Radiation counter 100 preferably further comprises a sensor 150 adapted to automatically activate the counter when the sensor is activated. The sensor 150 preferably is situated near the entrance 152 of the counter 100 and forms a part of and is operated with the system electronics as shown in FIG. 5. One suitable sensor 150 comprises a photoelectric eye which when the source 18 activates when entering the area to feed or drink. The sensor 150 in turn activates the radiation counter 10 and allows continual and regular monitoring of livestock at a location remote from the operator. Automatic activation of the radiation counter 10 by the source 18 eliminates the human labor required in herding the animals into a chute or pen prior to analysis.

Returning to FIG. 6, the radiation counter 100 may further comprise a source identifier 158 adapted to identify the source 18. This is especially useful in passive monitoring. One preferable source identifier 158 is a bar code scanner positioned on the counter 10. The bar code scanner reads a bar code secured to the animal, likely on an ear tag on the animal, and records the identifying information in the computer 54. The source identifier forms a part of and is operated with the system electronics 44. A camera 160 may be employed alternatively or in addition to the source identifier 158 to create a visual record of the analysis.

Still referring to FIG. 6, the radiation counter 100 may further comprise a scale 162 adapted to electronically weigh the source 18 when it enters the radiation counter 10. The electronic scales 162 automatically weigh the animal upon activation of the radiation counter 100 by sensor 150 and are operated in conjunction with the system electronics 44 as a part thereof. The weight of the animal is entered into the computer 60 for analysis with the spectral data.

The system electronics 44 for the automatic sensors and for the data processing system 44 may be supported inside the housing 108 for protection as shown in FIG. 6.

The radiation counter 100 is mountable to a trailer via attachment plate 170 or some other suitable attachment means and to a feeder head gate or other structure via at least one mount 172. Multiple radiation counters 100 may be connected in sequence to provide a walkway effect and for that purpose the frame 112 preferably further comprises bolt holes 180 and 182.

The Method of the Present Invention

The present invention further comprises a method for detecting radiation from a source in an out-of-doors environment and using a radiation counter. In accordance with the method of the present invention, the radiation counter has a detection surface and is characterized by the ability to detect radiation from the source positioned anywhere within an upper $2\pi$ solid angle relative to the detection surface of the radiation counter. The method comprises the steps of, first, positioning the radiation counter with respect to the source so that the source is positioned within an upper $2\pi$ solid angle relative to the detection surface of the radiation counter and so that detection of ambient radiation is minimized; and, second, counting radiation from the source.

In accordance with the method of the present invention, the method may further be limited to detecting only gamma radiation from the source or may comprise the additional steps of passively monitoring the growth of muscle in animals and automatically, electronically weighing and identifying the animal as explained herein. The method may further comprise the step of automatically adjusting the position of the radiation counter to the appropriate level for the source. The method may comprise the additional step of transmitting spectral data to a computer located on-site or at a remote location.

The resulting spectral data gathered practicing the method of the invention can be analyzed and applied to genetically engineer offspring and determine when to sell or slaughter animals. Because an animal's tendency to gain fat is hereditary, if two animals with high fat ratios breed, the offspring likely will have a high fat ratio. The radiation counter 10 and 100 is useful in monitoring the lean ratios of livestock and to predict the characteristics of the offspring and genetically engineer an animal having a high lean ratio.

The method is particularly useful in assessing the point at which an animal is ready for sale or slaughter. An animal may be monitored over time and the data analyzed to chart the growth of fat and muscle. After a period of time, the animal's lean muscle growth curve peaks and levels, at which time the fat growth curve continues to climb. At some point in time, meat growth levels off, while fat growth continues. The nexus of the growth curves indicates the point at which the animal gains fat more quickly than muscle. The method of the present invention thus is useful in determining the age at which an the animal should be sold or slaughtered.

Additionally, the method of the present invention may be used to measure the lean muscle yield grades of carcasses. Currently, meat graders visually inspect carcasses and assign a USDA yield grade based upon the visual inspection of the exterior of the carcass. The potential for human error is present in such a method, and the radiation counter of the present invention may be utilized to determine the ultimate lean yield of a carcass, thereby reducing errors associated with the current methods.

Test Results

The background radiation readings of the environment are an important baseline in radiation counting. When testing a radioactive source, the background radiation with no source present is first tested and the resultant count is used as a baseline against which the source is then measured and compared. The radiation count of the source must exceed the background count. The difference between the background count and the counts collected from the source is indicative of the amount of radioactivity of the source.

Figure 13:
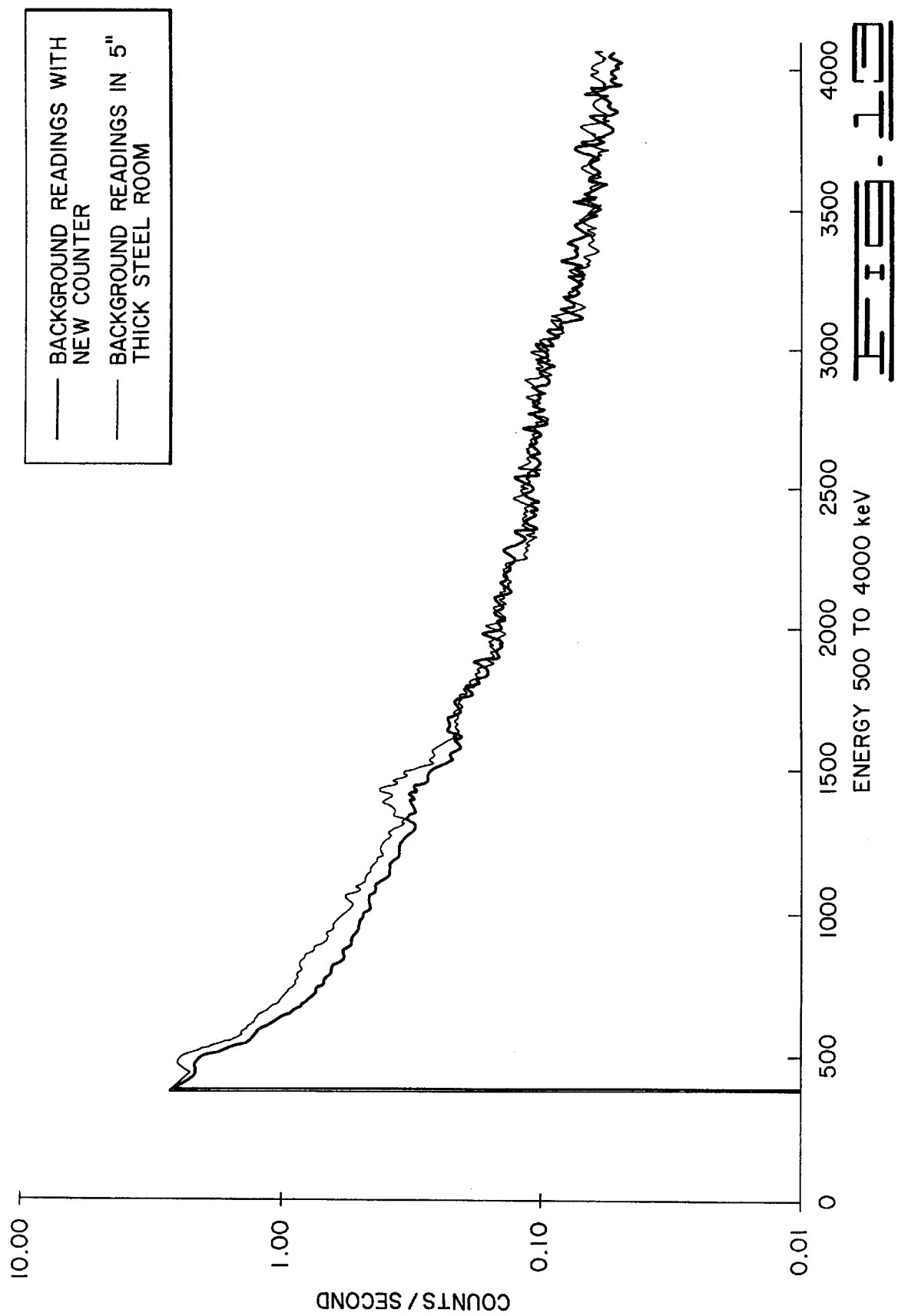
FIG. 13 is a graph comparing the background count in an energy range between 500 keV to about 4000 keV as counted by the radiation counter of the present invention and by a conventional radiation counter.
Figure 14:
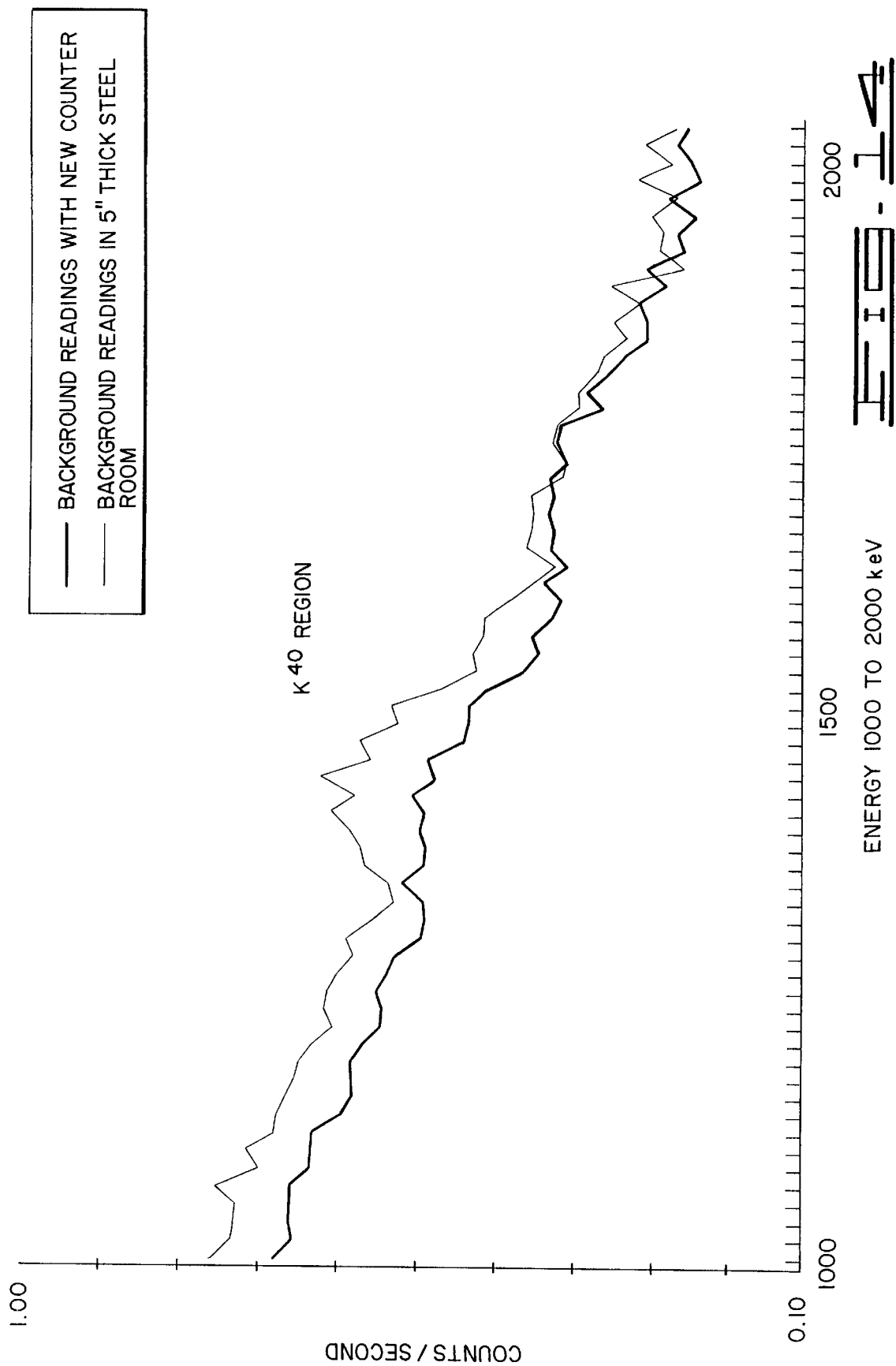
FIG. 14 is a graph comparing the background count in an energy range between 1000 keV to about 2000 keV as counted by the radiation counter of the present invention and by a conventional radiation counter.

The following spectral data demonstrate the effectiveness and accuracy of the radiation counter 10 and 100 of the present invention. Turning now to FIGS. 13 and 14, background gamma radiation readings were taken using a conventional 30 ton, low background counting room comprising a large room-sized shield having five inch (12.7 centimeters) thick steel walls and having a radiation detection unit positioned therewithin. These conventional, low-background room counters are reliable and can be used as a reference for other counters. The radiation counter 10 and 100 of the present invention was operated in the same environment as the conventional, low background counting room to obtain background gamma radiation readings.

The counts per second as determined by each counter were plotted versus the energy level in keV. As shown in FIGS. 13 and 14, the background radiation reading of the radiation counter 10 and 100 of the present invention was very similar to the background reading as measured by the conventional low background room counter, which demonstrates the effectiveness of the present invention in producing a suitable background baseline without the need for a large enclosed shield.

FIG. 13 shows that the background counts are very similar throughout a wide energy range from about 500 keV to about 4000 keV, which is the range of gamma rays normally measured by scintillation detectors. The graph of FIG. 14 focuses in the energy range from about 1000 to about 2000 keV and shows the region of interest ("ROI") for $K^{40}$ measurement, which is approximately 1462 keV. The radiation counter of the present invention produced a slightly lower background reading in the ROI than the convention shielded counter, thus demonstrating the accuracy of results of the present invention.

Figure 15:
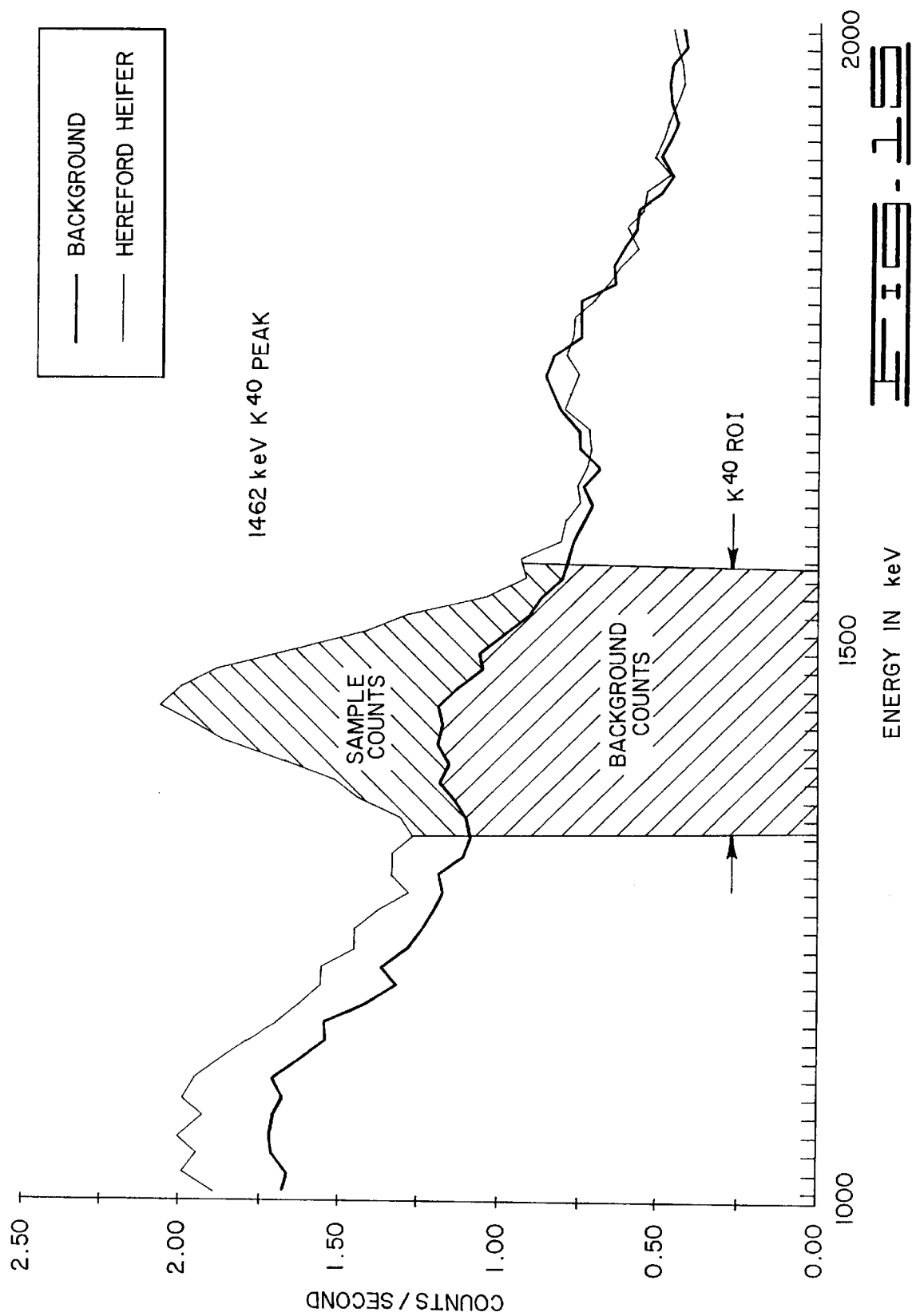
FIG. 15 is a graph comparing the spectral data of the environment and of a source of radiation as counted by the radiation counter of the present invention.

Turning next to FIG. 15, the resultant spectral data of the source, here a Hereford heifer, was plotted against the background reading as determined by the radiation counter of the present invention. In the $K^{40}$ ROI, the radiation count of the source was well above the low background count, thus demonstrating the radiation counter of the present invention is effective and accurate in measuring the level of radiation in a radioactive source.

Now it will be appreciated that the radiation counter of the present invention provides a comparatively small, lightweight, economical, transportable machine useful in a variety of applications. It will further be appreciated that the present invention provides a new method for measuring muscle mass of animals and carcasses. Changes may be made in the combination and arrangements of the various parts, elements, steps and procedures described herein without departing from the spirit and scope of the invention as defined in the following claims.

I claim:

1. A radiation counter for measuring the level of radiation from a radioactive source, the radiation counter intended for use in an outdoor environment and comprising:
   a frame adapted to support the source; and
   a radiation detection unit adapted to be positioned with respect to the source so as to minimize detection of terrestrial radiation;
      wherein the radiation detection unit defines a detection surface capable of detecting radiation from the source positioned anywhere within an upper $2\pi$ solid angle relative to the detection surface of the radiation detection unit, so that when at least a portion of the source is positioned within the $2\pi$ solid angle, detection of terrestrial radiation is minimized.

2. The radiation counter of claim 1 further comprising a mounting assembly adapted to position the radiation detection unit beneath the source.

3. The radiation counter of claim 1 further comprising a mounting assembly adapted to position the radiation detection unit to the side of the source.

4. The radiation counter of claim 1 wherein the radiation detection unit comprises:
   a detector adapted to detect radiation, the detector positionable near the source so as to minimize detection of ambient radiation; and
   a shield positionable near the detector, the shield being characterized by the ability to reduce detection of ambient radiation to a level lower than the radiation level of the source.

5. The radiation counter of claim 4 wherein:
   the shield houses the detector and defines a detection surface and an aperture formed in the detection surface, the aperture exposing at least a portion of the detector; and
   the radiation detection unit is positionable with the aperture facing the source.

6. The radiation counter of claim 5 wherein the aperture is sized to permit detection of radiation along the full length of the detector.

7. The radiation counter of claim 5 wherein the shield further comprises an extension projecting a distance above the detection surface of the shield wherein the extension is characterized by the ability to minimize the detection of ambient radiation.

8. The radiation counter of claim 4 wherein the detector comprises a scintillator.

9. The radiation counter of claim 4 wherein the length of the detector approximates the length of the source.

10. The radiation counter of claim 9 wherein the detector is about 122 centimeters long.

11. The radiation counter of claim 4 wherein the source comprises an animal and the detector is positioned generally parallel with the underside of the abdomen of the animal.

12. The radiation counter of claim 4 wherein the width of the detector is about 10 centimeters.

13. The radiation counter of claim 4 wherein the cross section of the detector is rectangular.

14. The radiation counter of claim 4 wherein the detector comprises a housing, a sodium iodide crystal hermetically sealed in the housing and a photomultiplier tube optically coupled to the crystal.

15. The radiation counter of claim 4 wherein the shield is comprised of a material having an energy level dissimilar to the energy level of gamma rays.

16. The radiation counter of claim 4 wherein the shield is comprised of high purity lead.

17. The radiation counter of claim 16 wherein the shield is about 15 centimeters thick.

18. The radiation counter of claim 4 wherein the shield is integrally formed.

19. The radiation counter of claim 4 wherein the thickness of the shield is from about 8 centimeters to about 61 centimeters.

20. The radiation counter of claim 4 wherein the cross section of the detector is any geometry permitting detection of radiation.

21. The radiation counter of claim 1 wherein the radiation detection unit is adapted to detect radiation in an energy range from about 15 keV to about 3 MeV.

22. The radiation counter of claim 1 wherein the radiation detection unit is adapted to detect gamma radiation.

23. The radiation counter of claim 1 wherein the radiation detection unit weighs approximately 363 kilograms.

24. The radiation counter of claim 1 wherein the frame further comprises a ramp and platform assembly adapted to enable the source to move over the radiation detection unit during analysis.

25. The radiation counter of claim 1 further comprising a sensor adapted to activate the counter automatically when the sensor is activated to permit passive monitoring of the source.

26. The radiation counter of claim 25 wherein the sensor comprises a photoelectric eye.

27. The radiation counter of claim 1 further comprising a sensor adapted to determine the height of the source and further comprising an adjustment assembly adapted to adjust the position of the radiation detection unit to the appropriate position for the source.

28. The radiation counter of claim 27 wherein the adjustment assembly comprises:
 a support member adapted to support the radiation detection unit;
 at least one hydraulic cylinder operatively connected to the support member; and
 a power assembly adapted to extend and retract the hydraulic cylinder thereby moving the support member and adjusting the position of the radiation detection unit.

29. The radiation counter of claim I further comprising an electronic scale adapted to weigh the source.

30. The radiation counter of claim 1 further comprising a source identifier adapted to identify the source.

31. The radiation counter of claim 30 wherein the source identifier comprises a bar code scanner.

32. The radiation counter of claim 1 further comprising a data processing system adapted to analyze radiation readings.

33. The radiation counter of claim 32 wherein the data processing system comprises a gamma spectroscopy system.

34. The radiation counter of claim 33 wherein the gamma spectroscopy system further comprises a preamplifier, an amplifier, a pulse height analyzer and a computer.

35. The radiation counter of claim 34 wherein the gamma spectroscopy system further comprises a modem adapted to transmit data to an off-site location.

36. The radiation counter of claim 1 wherein the frame is comprised of a material penetrable by gamma rays.

37. The radiation counter of claim 36 wherein the frame is comprised of steel less than 1.27 centimeters thick.

38. The radiation counter of claim 1 further comprising a mounting assembly adapted to mount the radiation detection unit to another structure.

39. The radiation counter of claim 1 further comprising adapters adapted to connect multiple radiation counters.

40. A lean muscle measurement device for determining lean body mass by measuring the amount of $K^{40}$ present in a source, the lean muscle measurement device intended for use in an out-doors environment and comprising:
 a frame adapted to support the source; and
 a radiation detection unit adapted to be positioned with respect to the source so as to minimize detection of ambient radiation;
 wherein the radiation detection unit defines a detection surface capable of detecting radiation from the animal positioned anywhere within an upper $2\pi$ solid angle relative to the detection surface of the radiation detection unit so that when at least a portion of the source is positioned within the $2\pi$ solid angle, detection of ambient radiation is minimized.

41. The lean muscle measurement device of claim 40 further comprising a mounting assembly adapted to position the radiation detection unit beneath the source.

42. The lean muscle measurement device of claim 40 further comprising a mounting assembly adapted to position the radiation detection unit to the side of the source.

43. The lean muscle measurement device of claim 40 wherein the radiation detection unit comprises:
 a detector adapted to detect radiation, the detector positionable near the source so as to minimize detection of ambient radiation; and
 a shield positionable near the detector, the shield being characterized by the ability to reduce detection of ambient radiation to a level lower than the radiation level of the source.

44. The lean muscle measurement device of claim 43 wherein:
 the shield houses the detector and defines a detection surface and an aperture formed in the detection surface, the aperture exposing at least a portion of the detector; and
 the radiation detection unit is positionable with the aperture facing the source.

45. The lean muscle measurement device of claim 44 wherein the aperture is sized to permit detection of radiation along the full length of the detector.

46. The lean muscle measurement device of claim 44 wherein the shield further comprises an extension projecting a distance above the detection surface of the shield wherein the extension is characterized by the ability to minimize the detection of ambient radiation.

47. The lean muscle measurement device of claim 43 wherein the detector comprises a scintillator.

48. The lean muscle measurement device of claim 43 wherein the length of the detector approximates the length of the source.

49. The lean muscle measurement device of claim 48 wherein the detector is about 122 centimeters long.

50. The lean muscle measurement device of claim 43 wherein the source comprises an animal and the detector is positioned generally parallel with the underside of the abdomen of the animal.

51. The lean muscle measurement device of claim 43 wherein the width of the detector is about 10 centimeters.

52. The lean muscle measurement device of claim 43 wherein the cross section of the detector is rectangular.

53. The lean muscle measurement device of claim 43 wherein the detector comprises a housing, a sodium iodide crystal hermetically sealed in the housing and a photomultiplier tube optically coupled to the crystal.

54. The lean muscle measurement device of claim 43 wherein the shield is comprised of a material having an energy level dissimilar to the energy level of gamma rays.

55. The lean muscle measurement device of claim 43 wherein the shield is comprised of high purity lead.

56. The lean muscle measurement device of claim 55 wherein the shield is about 15 centimeters thick.

57. The lean muscle measurement device of claim 43 wherein the shield is integrally formed.

58. The lean muscle measurement device of claim 43 wherein the thickness of the shield is from about 8 centimeters to about 61 centimeters.

59. The lean muscle measurement device of claim 43 wherein the cross section of the detector is any geometry permitting detection of radiation.

60. The lean muscle measurement device of claim 40 wherein the radiation detection device is adapted to detect radiation in an energy range from about 15 keV to about 3 MeV.

61. The lean muscle measurement device of claim 40 wherein the radiation detection unit is adapted to detect gamma radiation.

62. The lean muscle measurement device of claim 40 wherein the lean muscle measurement device weighs approximately 360 kilograms.

63. The lean muscle measurement device of claim 40 wherein the frame further comprises a ramp and platform assembly adapted to enable the source to move over the radiation detection unit during analysis.

64. The lean muscle measurement device of claim 40 further comprising a sensor adapted to activate the counter automatically when the sensor is activated to permit passive monitoring of the source.

65. The lean muscle measurement device of claim 64 wherein the sensor comprises a photoelectric eye.

66. The lean muscle measurement device of claim 40 further comprising a sensor adapted to determine the height of the source and further comprising an adjustment assembly adapted to adjust the position of the radiation detection unit to the appropriate position for the source.

67. The lean muscle measurement device of claim 66 wherein the adjustment assembly comprises:

a support member adapted to support the radiation detection unit;

at least one hydraulic cylinder operatively connected to the support member; and a power assembly adapted to extend and retract the hydraulic cylinder thereby moving the support member and adjusting the position of the radiation detection unit.

68. The lean muscle measurement device of claim 40 further comprising an electronic scale adapted to weigh the source.

69. The lean muscle measurement device of claim 40 further comprising a source identifier adapted to identify the source.

70. The lean muscle measurement device of claim 69 wherein the source identifier comprises a bar code scanner.

71. The lean muscle measurement device of claim 40 further comprising a data processing system adapted to analyze radiation readings.

72. The lean muscle measurement device of claim 71 wherein the data processing system comprises a gamma spectroscopy system.

73. The lean muscle measurement device of claim 72 wherein the gamma spectroscopy system further comprises a preamplifier, an amplifier, a pulse height analyzer and a computer.

74. The lean muscle measurement device of claim 73 wherein the gamma spectroscopy system further comprises a modem adapted to transmit data to an off-site location.

75. The lean muscle measurement device of claim 40 wherein the frame is comprised of a material penetrable by gamma rays.

76. The lean muscle measurement device of claim 75 wherein the frame is comprised of steel less than 1.27 centimeters thick.

77. The lean muscle measurement device of claim 40 further comprising a trailer for hauling livestock.

78. The lean muscle measurement device of claim 40 further comprising a mounting assembly adapted to mount the device to another structure.

79. The lean muscle measurement device of claim 40 further comprising adapters adapted to connect multiple lean muscle measurement devices.

80. A method of detecting radiation from a source in an out-of-doors environment and using a radiation counter, the radiation counter defining a detection surface and being characterized by the ability to detect radiation from the source positioned anywhere within an upper $2\pi$ solid angle relative to the detection surface of the radiation counter, the method comprising the steps of:

positioning the radiation counter with respect to the source so that the source is positioned at least in part within an upper $2\pi$ solid angle relative to the detection surface of the radiation counter and so that detection of terrestrial radiation is minimized; and detecting radiation from the source.

81. The method of claim 80 wherein the source comprises an animal and wherein the step of detecting radiation from the source further comprises the step of detecting gamma radiation from the animal.

82. The method of claim 81 wherein the method further comprises the step of calculating the lean body mass of the source.

83. The method of claim 81 wherein the method further comprises the step of determining the point in time at which the growth of muscle in the source peaks.

84. The method of claim 80 further comprising the step of automatically electronically activating the radiation counter when the source enters the radiation counter.

85. The method of claim 80 further comprising the step of automatically electronically adjusting the position of the radiation counter to the appropriate height for the source.

86. The method of claim 80 further comprising the step of automatically electronically identifying the source.

87. The method of claim 80 further comprising the step of transmitting spectral data from radiation counter to a computer.

88. The method of claim 80 further comprising the step of analyzing the radiation readings.

89. The method of claim 80 wherein the source comprises a carcass and wherein the step of detecting radiation from the source further comprises the step of detecting gamma radiation from the carcass.

* * * * *